Feb. 6, 1923.
W. C. GOODWIN.
CALCULATOR.
FILED MAR. 1, 1920.
1,444,602.
2 SHEETS—SHEET 1.
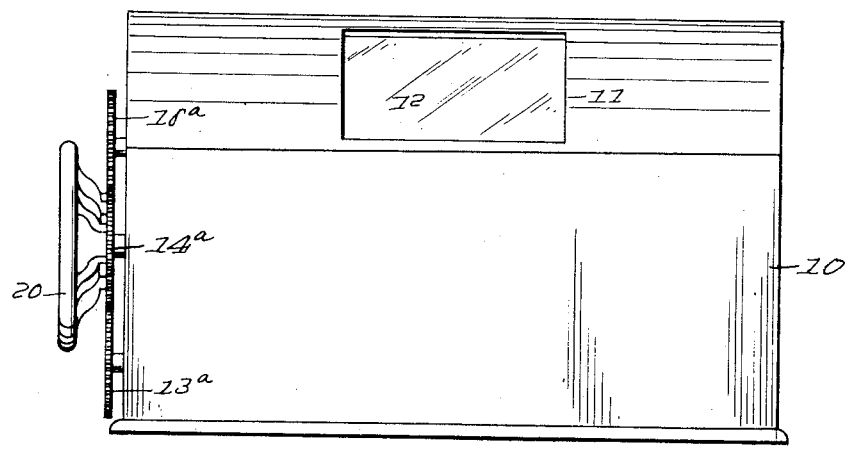
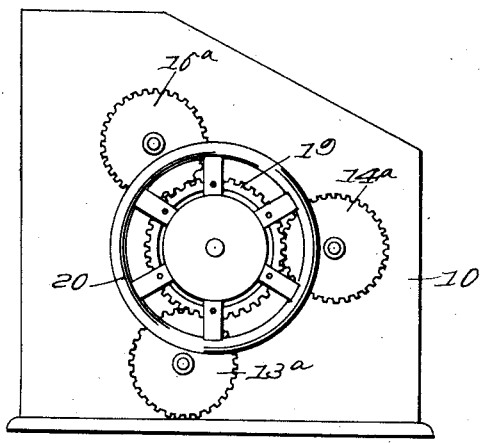 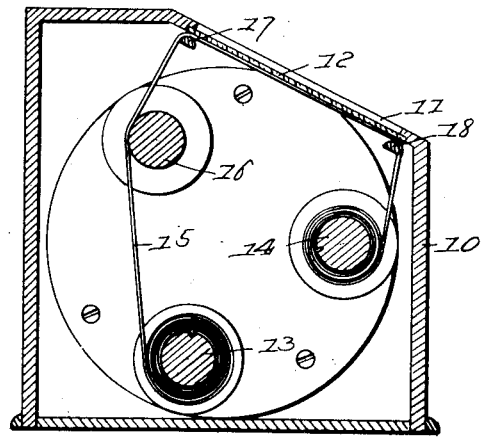
Inventor
W. C. Goodwin,
By
Attorney Feb. 6, 1923.
W. C. GOODWIN.
CALCULATOR.
FILED MAR. 1, 1920.
1,444,602.
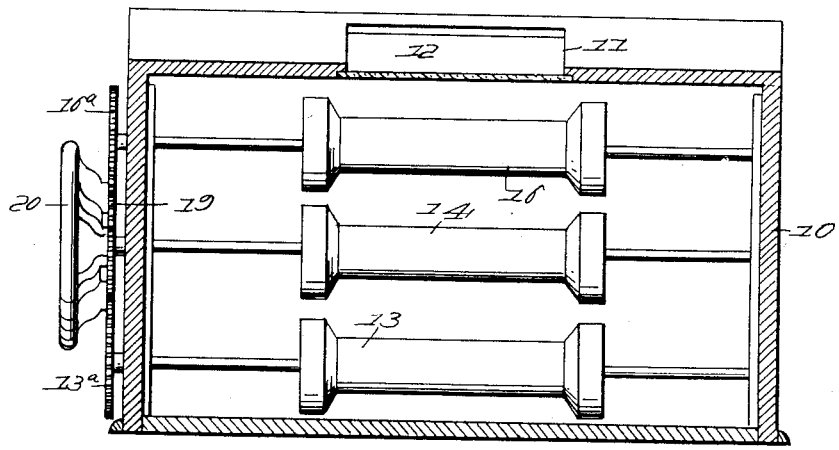

Patented Feb. 6, 1923.

1,444,602

UNITED STATES PATENT OFFICE.

WILLIS C. GOODWIN, OF WOODRUFF, SOUTH CAROLINA.

CALCULATOR.

Application filed March 1, 1920. Serial No. 362,223.

*To all whom it may concern:*

Be it known that WILLIS C. GOODWIN, a citizen of the United States of America, residing at Woodruff, in the county of Spartanburg and State of South Carolina, has invented new and useful Improvements in Calculators, of which the following is a specification.

The object of the invention is to provide a device for use in weighing grain, coal, ore and various products usually presented to the scale in bulk and in such containers as wagons or carts for the convenience of the scale tender in noting the net weight for the purpose of keeping an accurate record thereof with reference to the several loads subjected to the weighing operation without the inconvenience or liability of error in calculation due to subtracting the tare from the gross weight in determining the net weight and in connection with which calculation the possibility of error is such as to constitute an important consideration in keeping such records, and with this object in view the invention consists in providing an apparatus having an adjustable tape or runner upon which are indicated different combinations of gross and tare weights with the necessary related calculations indicated thereon by giving the corresponding net weight, so that the tender by reference to the graduations and by a proper selection of the corresponding gross and tare weights may note the proper net weight without going through the process of subtracting one from the other, and in this connection in a construction and combination of parts of which a preferred embodiment is shown in the accompanying drawing, wherein:

Figure 1 is a front view of the apparatus.

Figure 2 is an end view of the same.

Figure 3 is a transverse sectional view.

Figure 4 is a longitudinal sectional view.

Figure 5 is a detail view of a portion of the tape.

The apparatus consists essentially of a casing 10 provided in a convenient position for the operator with an inspection opening 11 preferably fitted with a glass or other transparent filler 12, and a plurality of supply rolls or drums 13 and 14 to which are attached the extremities of a flexible tape 15 traversing a guide roll 16 and direction guides 17 and 18 which are located adjacent the opposite edges of the inspection opening to expose the intermediate portion of the tape with the graduations or inscriptions thereon within view of the operator.

These graduations or inscriptions consist of related gross and tare weights of graduated values to correspond with the possible variations in the gross and tare weights of loaded receptacles presented for the weighing operation, together with the related net weight determined by the subtraction of the tare weight from the gross weight so that when a vehicle with its load is presented the scale tender by the adjustment of the apparatus to bring that portion of the tape into view through the inspection opening which bears the corresponding indications of gross and tare weights may determine the net weight and make a note of the same with reference to the number or other designation of the team or driver, as a record of the transaction.

The means which have been illustrated in the drawing for facilitating the adjustment of the tape to present the proper portion of its surface at the inspection opening consist of pinions 13$^a$, 14$^a$, and 16$^a$ attached respectively to the spindles of the drums 13, 14 and 16 and a master gear 19 meshing with said pinions and carrying a hand wheel 20 which may be turned in either direction to produce a corresponding proportionate revolution of the drums to move the tape in either direction and thus wind it upon one of the supply drums and unwind it from the other as may be required.

It will be understood that this operation of moving the tape to bring the proper graduations corresponding with the gross and tare weights indicated by the scale may be accomplished quickly and with the minimum effort upon the part of the operator, and as a direct comparison between the weights indicated by the scale and those of the graduations on the tape may be made directly, the possibility of error in this connection is reduced to the minimum, and when the proper portion of the tape is exposed the net weight is indicated for the information of the operator, so that no mistake in the record due to a miscalculation or error in subtraction need occur.

What is claimed is:

A device for the purpose specified comprising a casing provided with an inspection opening, a hand wheel mounted on the side of the casing, a pair of supply drums and an idler drum disposed within the casing arranged with their axes in a circle concentric with the hand wheel, all of said drums being disposed a uniform distance apart, a tape terminally attached to and reeled upon said supply drums, geared connections between all of said drums and the hand wheel, and guiding means for holding the intermediate portion of said tape adjacent said inspection opening, the said tape being provided with prearranged data for selective presentation at the inspection opening by means of operation of the hand wheel.

In testimony whereof he affixes his signature.

WILLIS C. GOODWIN.